United States Patent
Consoli et al.

(10) Patent No.: US 7,534,278 B2
(45) Date of Patent: May 19, 2009

(54) GRANULATOR DEVICE FOR THE TREATMENT OF POWDERED PRODUCTS

(75) Inventors: Salvatore Fabrizio Consoli, Bologna (IT); Andrea Nora, Castelnuovo Rangone (IT); Roberto Trebbi, Castenaso (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 528 days.

(21) Appl. No.: 10/567,094

(22) PCT Filed: Aug. 2, 2004

(86) PCT No.: PCT/IB2004/002551

§ 371 (c)(1),
(2), (4) Date: Feb. 3, 2006

(87) PCT Pub. No.: WO2005/014159

PCT Pub. Date: Feb. 17, 2005

(65) Prior Publication Data

US 2008/0148944 A1 Jun. 26, 2008

(30) Foreign Application Priority Data

Jul. 8, 2003 (IT) .......................... BO2003A0486

(51) Int. Cl.
*B01D 46/04* (2006.01)

(52) U.S. Cl. .............. 55/302; 55/294; 95/280; 95/281; 96/233; 96/229; 96/230

(58) Field of Classification Search ............ 55/302, 55/294; 96/233, 229, 230; 95/280–281
See application file for complete search history.

(56) References Cited

U.S. PATENT DOCUMENTS 3,443,696 A * 5/1969 Schutte ................ 210/297
5,114,444 A * 5/1992 Stuble ................ 55/294
5,444,892 A 8/1995 Ris et al.

FOREIGN PATENT DOCUMENTS

FR 2 304 386 10/1976

* cited by examiner

*Primary Examiner*—Duane S Smith
*Assistant Examiner*—Dung Bui
(74) *Attorney, Agent, or Firm*—Arent Fox LLP

(57) ABSTRACT

A granulator device (101) for the treatment of powdered products comprises a closed container (102) forming a chamber (103) for treatment of the products, filter elements (104, 105) projecting into the treatment chamber (103), the filter elements comprising a multi-layer filtering wall (105) through which a fluid current can pass, and powder removing parts (106; 107, 108, 109, 110) designed to diffuse at least one service fluid directed towards at least the filtering wall (105); the powder removing parts (106; 107, 108, 109, 110) having at least first diffuser nozzles (107) and at least second diffuser nozzles (108) to diffuse the service fluid so as to free the filtering wall (105) of the powders trapped in it; there also being parts (140, 142, 147) for supporting and driving the filter elements (104, 105) which can change the angle of the filter elements (104, 105) from a first operating position, in which at least the first nozzles (107) act on the filtering wall (105), to a second operating position in which the filter elements (104) are set at an angle to the first operating position to allow the second diffuser nozzles (108) to operate on the filtering wall (105).

16 Claims, 3 Drawing Sheets

GRANULATOR DEVICE FOR THE TREATMENT OF POWDERED PRODUCTS

CROSS-REFERENCE TO RELATED APPLICATON

This application is a National Stage entry of International Application Number PCT/IB2004/002551, filed Aug. 2, 2004. The disclosure of the prior application is hereby incorporated herein in its entirety by reference.

TECHNICAL FIELD

The present invention relates to a granulator device used for the treatment of powdered materials.

In particular, the invention relates to the treatment of powdered materials such as powdered chemical and pharmaceutical products, to which specific reference is made in the following description, without thereby limiting the scope of the invention, using an operating fluid current, that is to say, gaseous fluids or nebulised liquids which, according to the various cases, is used to disagglomerate, wash, support, transport and coat the powdered products during their specific treatment.

BACKGROUND ART

In powdered materials technology devices are known which are commonly called fluid bed granulator devices, generally used for the treatment of the materials and basically comprising containers with sealed walls, delimiting a chamber for treatment of the materials, permanent filters, with solid walls, projecting into the treatment chamber, means for conveying an operating fluid current through the chamber, and means designed to perform operations which remove powder from and wash the permanent filters.

The operations for removing powder from and washing the filters, designed to restore the original functionality of filters clogged or whose efficiency was reduced by use, or to prepare the device to treat a different product to that treated in a previous processing cycle, have quite a critical role in many powder technologies used, for example, for some chemical or pharmaceutical products.

Such operations must be performed in a suitable way to prevent the operating fluids entering the device from contaminating the product and/or the operating fluids fed out of the device from contaminating the environment, and/or maintenance operations on the filters and on the other operating parts of the device from constituting a health risk for the personnel who carry them out, and for the surrounding environment.

A granulator device of the type described above is known, for example, in patent EP 781.585 B1, in which the permanent filters have rigid filtering walls formed by two or more overlapping layers of metal mesh which are made integral with one another by a sintering process.

Therefore, powder is removed from the filters and they are washed respectively by blowing counterflowing pressurised air through the filtering wall, the air emitted from stationary nozzles covering the entire extent of the filtering surface of each of the filters, and by washing down the outer surface of the filters by directing a flow of water diffused from special nozzles, also stably supported by the outer walls of the container which circumscribes the product treatment chamber.

A device structured in this way allows satisfactory filter cleaning for most applications, in particular during the treatment of powdered products for pharmaceutical use, but is very complex from a construction viewpoint, very expensive and it is particularly difficult to check its effectiveness.

For these reasons, granulator devices are currently known and used which are made as separable modules with independent drive units, so that maintenance personnel find it easier to manually remove powder from and wash the filters when they are permanent, or granulator devices with filter means consisting of bags of special filtering fabrics applied on metal wire frame supporting structures, such as that described and illustrated in United States patent U.S. Pat. No. 5,723,160, so that maintenance operations simply consist of substituting the filter bags.

However, such fabric filters are particularly expensive and their simple substitution involves opening the above-mentioned treatment chamber, and so inevitably contamination of the chamber by external agents.

DISCLOSURE OF THE INVENTION

The aim of the present invention is, therefore, to overcome the disadvantages of the prior art described above.

In particular, one aim of the present invention is to provide a granulator device with simple, inexpensive construction and in which the operations for removing powder from and washing the filtering means can be performed with great efficiency and speed.

Accordingly, the present invention provides a granulator device for the treatment of powdered products, comprising at least one closed container forming a chamber for treatment of the products; filter means projecting into the treatment chamber, the filter means comprising at least one multi-layer filtering wall through which at least one fluid current can pass; and powder removing parts designed to diffuse at least one service fluid directed at least towards the filtering wall; the device being characterised in that the powder removing parts comprise at least first diffuser nozzles and at least second diffuser nozzles for diffusing the service fluid in such a way as to free the filtering wall of the powders trapped in it; there being means for supporting and driving the filter means, to change the angle of the filter means from a first operating position in which at least the first nozzles act on the filtering wall, to a second operating position in which the filter means are set at an angle to the first operating position to allow at least the second diffuser nozzles to operate on the filtering wall.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DETAILED DESCRIPTION OF THE PREFERRED EMBODIMENTS OF THE INVENTION

Figure 1:
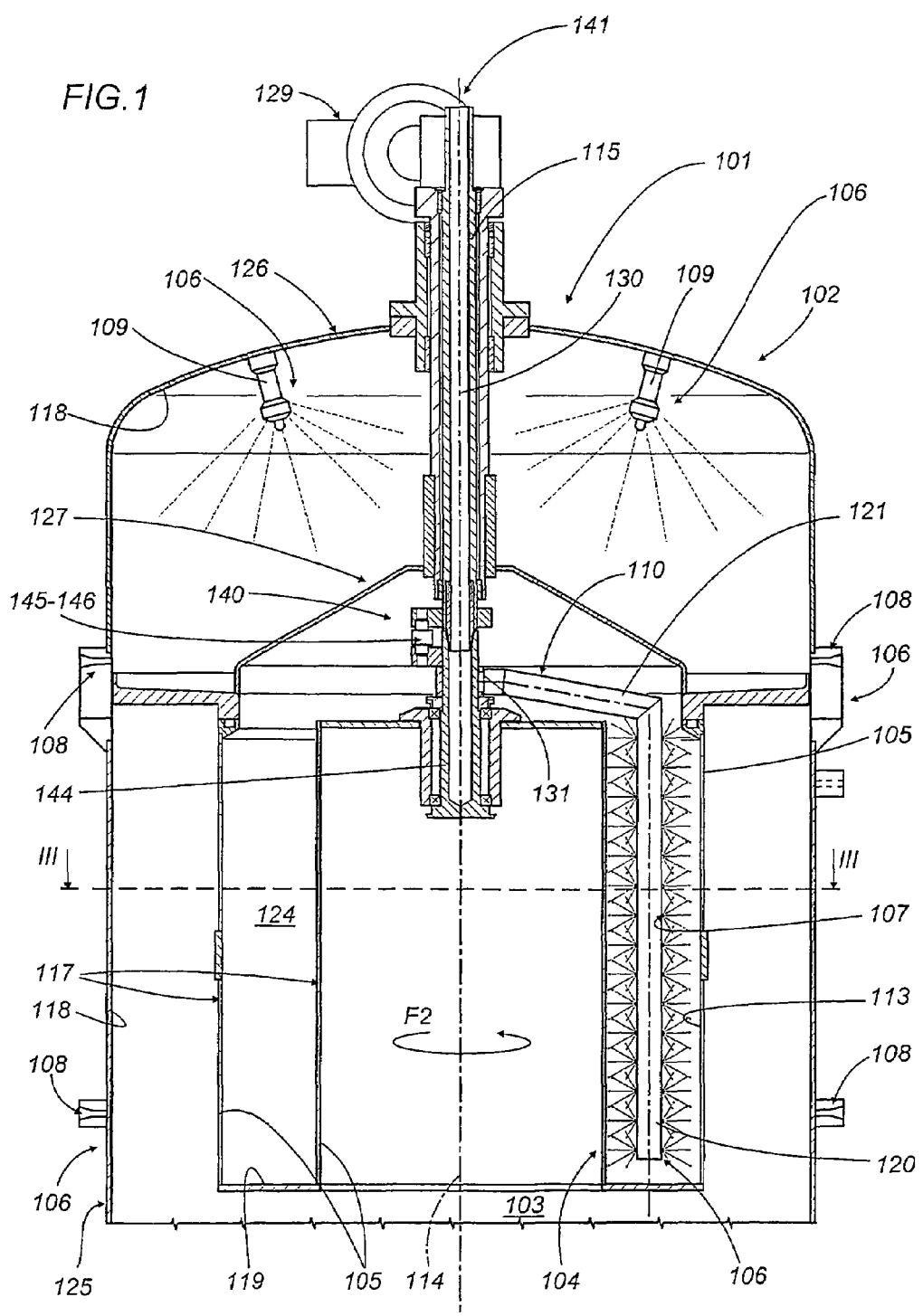
FIG. 1 is a front view, partly in cross-section, with some parts cut away for greater clarity, of an embodiment of a granulator device in a first operating condition.

With reference to FIG. 1, the numeral 101 denotes as a whole a granulator device for the treatment of powdered pharmaceutical products which uses, for the specific treatment cycle, in the conventional and known way, a fluid current designed for example to transport, support, coat, humidify, etc. the powdered products.

The device 101 basically comprises a conventional container 102 and a filter 104 with relative powder removing means, labelled 106 as a whole.

The container 102 has a vertical cylindrical body 125 and is closed at the top by a dome 126, the lower part having walls 118 which encompass, completely delimiting, a chamber 103 for treatment of the products.

Figure 2:
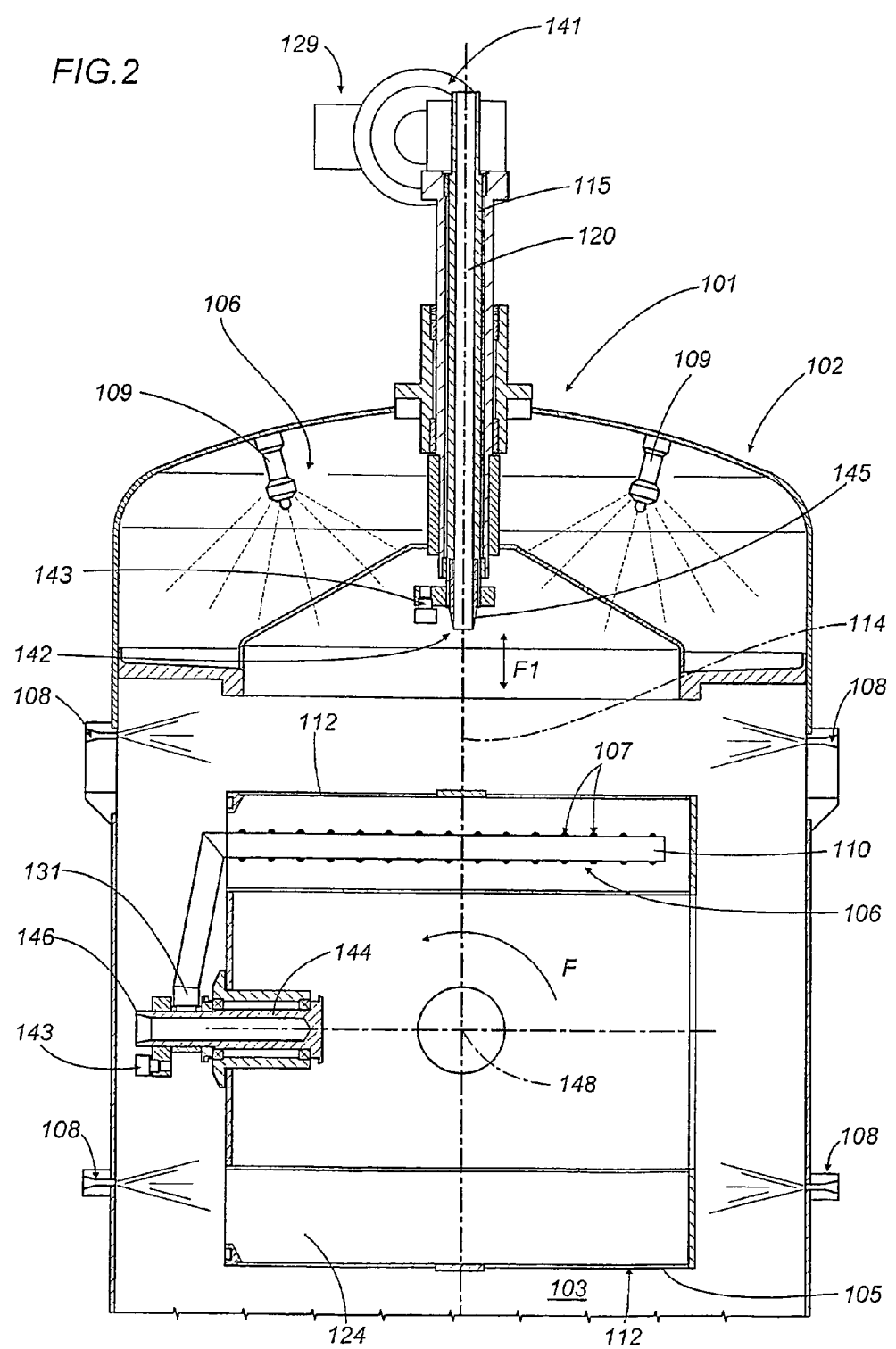
FIG. 2 is a side view, partly in cross-section, of the device illustrated in FIG. 1 in a second operating condition.

The single filter 104 preferably, but without limiting the scope of the invention, has the shape of a completely hollow solid, axially symmetrical which, as illustrated in FIGS. 1 and 2, has a substantially cylindrical toroidal shape, with an internal hollow 124 closed on one side by a flat base 119, which is in turn circular in shape.

The filter 104 also includes a filtering wall 105 extending both to the internal and external side, cylindrical edge of the filter 104 and to the flat base 119.

The filtering wall 105 is rigid and consists of multiple layers, obtained by overlapping a series of layers of metal mesh, having links with variable width, which are held integral with one another by a sintering process.

Such a filtering wall 105 is preferably obtained starting with corresponding semi-finished products made and marketed by the Swiss company BOPP & CO. AG, which has operated in the technical sector for the granulation of powdered pharmaceutical material since 1987, with the brand names "POREMET" or "ABSOLTA".

The filter 104 can be connected to a container 102 diaphragm 127 and projects into the treatment chamber 103, so that the fluid current (e.g.: air) passes through it as well as through the treatment chamber 103 when the powder is treated, in a way that is well known and not illustrated.

The means 106 for removing powder from the filter 104 normally comprise three types of nozzles 107, 108, 109 and an arm 110 designed to support the first type of nozzle 107 in a mobile fashion in the operating condition, whilst the second 108 and third 109 nozzles are connected to stationary elements of the outer walls 118 of the container 102.

The first type of nozzle 107 is attached to the first arm 110 and is designed to allow the diffusion towards the filter 104 of a first gaseous fluid consisting, for example, of pressurised air. In contrast, the second 108 and the third 109 types of nozzle are both designed to spray a current of water intended to wash parts of the device 101.

FIG. 1 illustrates how the arm 110 is housed in the filter 104 hollow 124 and has a shape which matches the meridian profiles, respectively internal and external, of the hollow 124.

More particularly, the arm 110 comprises two segments 120, 121, straight and integral with one another, angled to project cantilever style from a tubular drive shaft 115 which moves the arm 110.

The segment 120 of the arm 110 is fitted with the first nozzles 107 which project in two directions towards the internal face 113 of opposite sides of the filter 104 filtering wall 105.

The arm 110 drive shaft 115 is mechanically connected to drive means 129 outside the container 102 dome 126 by mechanical coupling means 140 (FIG. 1), which allow the shaft 115 to be removably connected to the drive means 129.

Figure 3:
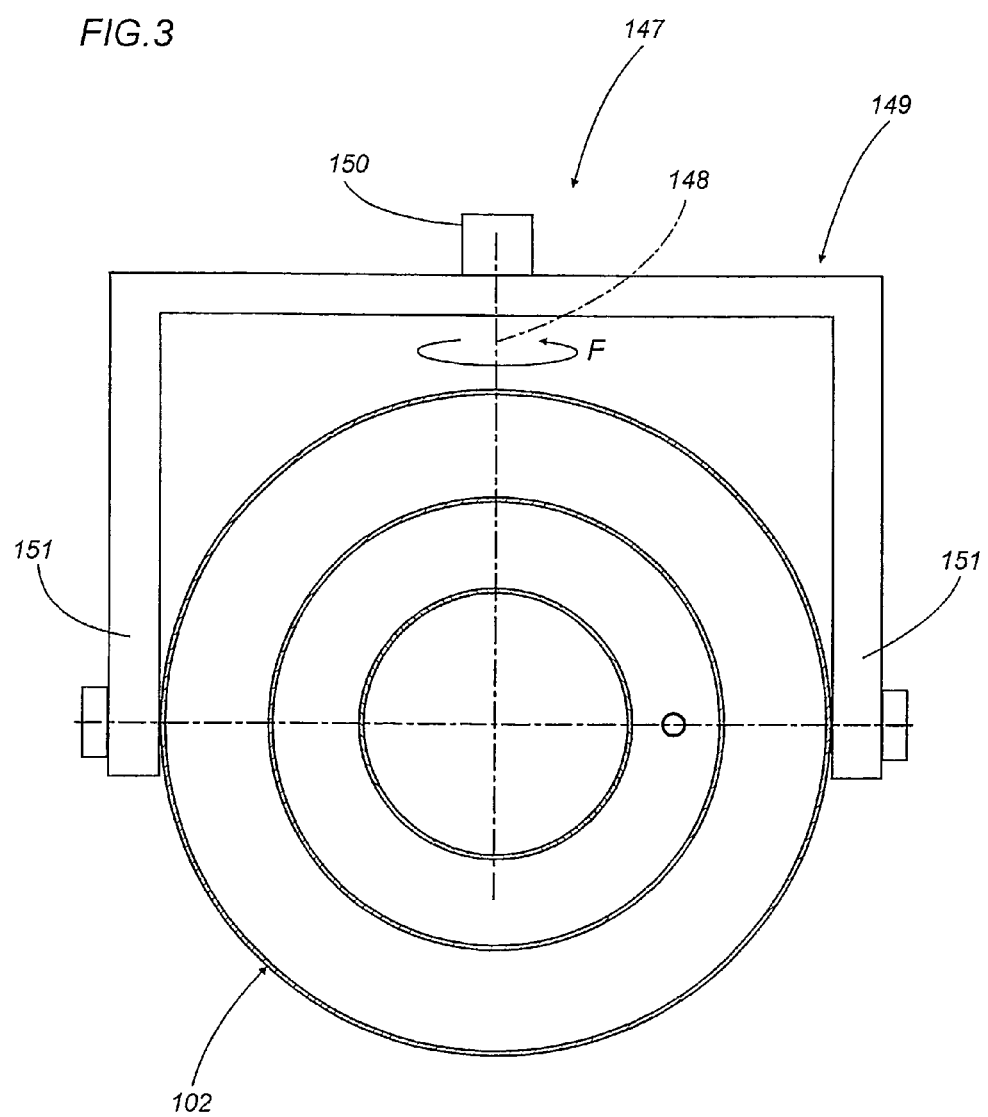
FIG. 3 is a schematic cross-section of the device illustrated in FIG. 1 according to the line III-III.

As illustrated in FIGS. 1, 2 and 3, the coupling means 140 are part of a plurality of means 140, 142, 147 for supporting and driving the filter 104 acting on the filter 104 to allow a change of the angle of the filtering wall 105 from a first operating position for powder removal (illustrated in FIG. 1), in which at least the set of first nozzles 107 acts on the filtering wall 105, to a second operating position for powder removal (illustrated in FIG. 2, with anti-clockwise rotation indicated by the arrow F), in which the filter 104 is set at an angle to the first operating position, and in which the second nozzles 108 and the third 109 nozzles act on the filtering wall 105.

As is better illustrated in FIGS. 1 and 2, the coupling means 140 comprise opposite cranks 143 which respectively extend radially from the drive shaft 115 and from a driven shaft 144 which is permanently integral with the arm 110. In practice, the cranks 143 may be connected to and disconnected from one another following relative movements by the drive shaft 115 and the driven shaft 144 in the two opposite directions of their shared axis 114 (arrow F1 in FIG. 2).

The device 101 also has means 141 for conveying the service fluid to the first nozzles 107 with hydraulic connecting means 142 that are removable when necessary and form part of the drive means 140, 142, 147.

As illustrated in FIGS. 1 and 2, the hydraulic connecting means 142 comprise a first tubular pipe 130 in the drive shaft 115 of the arm 110, and a second tubular pipe 131 in the driven shaft 144.

The first pipe 130 and the second pipe 131 are removably connected to one another by matching end seal couplings 145 and 146 on the drive shaft 115 and the driven shaft 144. In other words, the axial movement of the two shafts 115 and 144 which determines the mechanical connection or disconnection of said elements also simultaneously determines hydraulic connection or disconnection of the same elements, allowing the service fluid from conventional supply means outside the container 102 to reach the nozzles 107 of the arm 110 or preventing this from happening.

As illustrated in FIGS. 1, 2 and 3, the device 102 also comprises means 147 for supporting the filter 104, which are rotatably mounted about an axis 148 transversal to the axis of rotation 114 of the arm 110 to allow said change in the angle of the filter 104 for easier powder removal above all in terms of washing by the nozzles 108 and 109 fitted on the cylindrical portions of the container 102 walls 118.

In particular, the supporting means 147, which are part of the drive means 140, 142, 147, comprise a fork 149 (FIG. 3) which rotates about a fixed pin 150, the latter supported by the container 102 wall 118. The fork 149 has tines 151 between which the filter 104 is inserted and constrained.

Operation of the device 101 powder removing means 106 is easily deduced from FIG. 1 by observing that thanks to the driving action provided, the arm 110 can rotate about a fixed axis of rotation (see arrow F2 anti-clockwise) which coincides with the filter 104 axis of symmetry 114 and can simultaneously carry the service fluid to be diffused against the filter 104 internal faces 113 to the nozzles 107.

Since the first nozzles 107 are fitted to the arm 110 in such a way that they are opposite a filtering wall 105 surface area that is relatively limited and substantially confined about a generatrix 117 of the shape of the filtering wall 105 (a wall 105 which may be considered generated by rotation of the generatrix 117 about the axis 114 of the solid), the rotation of the arm 110 combined with ejection of the service fluid from the respective nozzles 107, allows the entire length of the surface of the filtering wall 105 to be gradually covered, concentrating the entire service fluid flow on limited areas in turn.

Therefore, this maximises the efficiency of powder removal from the filter 104, allowing uniform powder removal from the filter 104 to be achieved in the optimum way and rapidly, without the operator having to intervene by opening the treatment chamber 103.

In contrast, when the filter 114 is moved to the configuration illustrated in FIG. 2, that is to say, when it is substantially rotated through 90° relative to the previous configuration, the supply of pressurised air from the first nozzles 107 stops, whilst the second nozzles 108 and the third nozzles 109 are activated with a current of water, washing away the residue powders not only from the external face 112 (FIG. 2) of the filter 104 filtering wall 105, but also from the container 102 internal walls 118, as well as from the remaining internal parts of the device 101.

The invention described can be subject to modifications and variations without thereby departing from the scope of the inventive concept. Moreover, all the details of the invention may be substituted by technically equivalent elements.

The invention claimed is:

1. A granulator device (101) for the treatment of powdered products comprising at least one closed container (102) forming a chamber (103) for treatment of the products; filter means (104, 105) projecting into the treatment chamber (103), the filter means (104, 105) comprising at least one multi-layer filtering wall (105) through which at least one fluid current can pass; and powder removing means (106, 107, 108, 109, 110) designed to diffuse at least one service fluid directed towards at least the filtering wall (105); the device (101) being characterised in that the powder removing means (106, 107, 108, 109, 110) comprise at least first diffuser nozzles (107) and at least second diffuser nozzles (108) to diffuse the service fluid so as to free the filtering wall (105) of the powders trapped in it; there also being means (140, 142, 147) for supporting and driving the filter means (104, 105) which can change the angle of the filter means (104, 105) from a first operating position, in which at least the first nozzles (107) act on the filtering wall (105), to a second operating position in which the filter means (104) are set at an angle to the first operating position to allow at least the second diffuser nozzles (108) to operate on the filtering wall (105).

2. The device according to claim 1, characterised in that the powder removing means (106, 107, 108, 109, 110) also comprise at least one arm (110) mobile about and relative to the filtering wall (105) and on which the first diffuser nozzles (107) are fitted in such a way that they gradually cover the length of the surface of the filtering wall (105), as the arm (110) moves, to diffuse the service fluid.

3. The device according to claim 2, characterised in that the arm (110) is rotatably mounted about an axis of rotation (114) integral with the filtering wall (105).

4. The device according to claim 2, characterised in that the filtering wall (105) belongs to a filter (104) which has the shape of a completely hollow solid; the arm (110) being housed inside the filtering wall (105).

5. The device according to claim 3, characterised in that the filtering wall (105) belongs to a filter (104) which has the shape of a completely hollow solid; the arm (110) being housed inside the filtering wall (105), and the first nozzles (107) supported by the arm (110) are positioned opposite a generatrix (117) from which the shape of the filtering wall (105) can be considered generated after rotation of the generatrix (117) about the axis of symmetry (114).

6. The device according to claim 4, characterised in that the filter (104) has a toroidal shape with an internal hollow (124); the arm (110) being housed in the hollow (124) and having a shape which matches the meridian profile of the toroidal shape.

7. The device according to claim 2, characterised in that the drive means (140, 142, 147) comprise coupling means (140) formed by opposite cranks (143) extending radially from a drive shaft (115) which moves the arm (110) and from a driven shaft (144) integral with the arm (110); the cranks (143) being able to connect to and disconnect from one another after relative movements by the drive shaft (115) and the driven shaft (144) in the two opposite directions of their shared axis of rotation (114).

8. The device according to claim 7, characterised in that it comprises means (141) for conveying the service fluid to the first nozzles (107) with hydraulic connecting means (142) that are part of the drive means (140, 142, 147); the connecting means (142) comprising a first tubular pipe (130) in the drive shaft (115) of the arm (110), and a second tubular pipe (131) in the driven shaft (144).

9. The device according to claims 7 or 8, characterised in that the filtering wall (105) belongs to a filter (104) which has the shape of a completely hollow solid; the arm (110) being housed inside the filtering wall (105), and the device comprises means (147) for supporting the filter (104), the supporting means (147) being able to rotate about an axis (148) transversal to the axis of rotation (114) of the arm (110), allowing the change in the angle of the filter (104).

10. The device according to claim 9, characterised in that the supporting means (147) consist of a fork (149) which rotates about a fixed pin (150), the latter supported by a wall (118) of the container (102); the fork (149) having tines (151) between which the filter (104) is inserted and constrained.

11. The device according to claim 1, characterised in that the powder removing means (106, 107, 108, 109, 110) also comprise third diffuser nozzles (109) supported in such a way that they are stationary by a container (102) wall (118).

12. The device according to claim 1, characterised in that the first nozzles (107) are supplied with a first service fluid which is a pressurized gaseous fluid.

13. The device according to claim 1, characterised in that at least the second nozzles (108) are supplied with a service fluid in the wet state.

14. The device according to claims 12 or 13, characterised in that the powder removing means (106, 107, 108, 109, 110) also comprise third diffuser nozzles (109) supported in such a way that they are stationary by a container (102) wall (118), and the third nozzles (109) are supplied with a service fluid in the wet state.

15. A granulator device (101) for the treatment of powered products comprising at least one closed container (102) forming a chamber (103) for treatment of the products; filter means (104, 105) projecting into the treatment chamber (103), the filter means (104, 105) comprising at least one multi-layer filtering wall (105) through which at least one fluid current can pass; and powder removing means (106, 107, 108, 109, 110) designed to diffuse at least one service fluid directed towards at least the filtering wall(105); the device (101) being characterised in that the powder removing means (106, 107, 108, 109, 110) comprise at least first diffuser nozzles (107) and at least second diffuser nozzles (108) to diffuse the service fluid so as to free the filtering wall (105) of the powders trapped in it; there also being means (140, 142, 147) for supporting and driving the filter means (104, 105) which can change the angle of the filter means (104, 105) from a first operating position, in which at least the first nozzles (107) act on the filtering wall (105), to a second operating position in which the filter means (104) are set at an angle to the first operating position to allow at least the second diffuser nozzles (108) to operate on the filtering wall (105); wherein the powder removing means (106, 107, 108, 109, 110) also comprise at least one arm (110) mobile about and relative to the filtering wall (105) and on which the first diffuser nozzles (107) are fitted in such a way that they gradually cover the length of the surface of the filtering wall (105), as the arm (110) moves, to diffuse the service fluid; the filtering wall (105) belonging to a filter (104) which has the shape of a completely hollow solid; the arm (110) being housed inside the filtering wall (105), and the first nozzles (107) supported by the arm (110) are positioned opposite a generatrix (117) from which the shape of the filtering wall (105) can be considered generated after rotation of the generatrix (117) about an axis of symmetry (114).

16. A granulator device (101) for the treatment of powdered products comprising at least one closed container (102) forming a chamber (103) for treatment of the products; filter means (104, 105) projecting into the treatment chamber (103), the filter means (104, 105) comprising at least one multi-layer filtering wall (105) through which at least one fluid current can pass; and powder removing means (106, 107, 108, 109, 110) designed to diffuse at least one service fluid directed towards at feast the filtering wall (105); the device (101) being characterised in that the powder removing means (106, 107, 108, 109, 110) comprise at least first diffuser nozzles (107) and at least second diffuser nozzles (108) to diffuse the service fluid so as to free the filtering wall (105) of the powders trapped in it; there also being means (140, 142, 147) for supporting and driving the filter means (104, 105) which can change the angle of the filter means (104, 105) from a first operating position, in which at least the first nozzles (107) act on the filtering wall (105), to a second operating position in which the filter means (104) are set at an angle to the first operating position to allow at least the second diffuser nozzles (108) to operate on the filtering wall (105); wherein the powder removing means (106, 107, 108, 109, 110) also comprise at least one arm (110) mobile about and relative to the filtering wall (105) and on which the first diffuser nozzles (107) are fitted in such a way that they gradually cover the length of the surface of the filtering wall (105), as the arm (110) moves, to diffuse the service fluid, wherein the drive means (140, 142, 147) comprise coupling means (140) formed by opposite cranks (143) extending radially from a drive shaft (115) which moves the arm (110) and from a driven shaft (144) integral with the arm (110); the cranks (143) being able to connect to and disconnect from one another after relative movements by the drive shaft (115) and the driven shaft (144) in the two opposite directions of their shared axis of rotation (114).

* * * * *

UNITED STATES PATENT AND TRADEMARK OFFICE
CERTIFICATE OF CORRECTION

| | |
|---|---|
| PATENT NO. | : 7,534,278 B2 |
| APPLICATION NO. | : 10/567094 |
| DATED | : May 19, 2009 |
| INVENTOR(S) | : Salvatore Fabrizio Consoli et al. |

It is certified that error appears in the above-identified patent and that said Letters Patent is hereby corrected as shown below:

Title Page:

Item (30), please change the Foreign Application Priority Data to read:

-- August 7, 2003 (IT)   ................. BO2003A0486 --

Signed and Sealed this

Twenty-eighth Day of July, 2009

JOHN DOLL
*Acting Director of the United States Patent and Trademark Office*